May 31, 1960

N. J. DE MILLE 2,938,556

FRUIT OR VEGETABLE PEELING OR CLEANING MACHINE

Filed Sept. 9, 1957

Inventor
Noel J. de Mille
By
Roy E. Petherbridge Attorney

May 31, 1960 N. J. DE MILLE 2,938,556
FRUIT OR VEGETABLE PEELING OR CLEANING MACHINE
Filed Sept. 9, 1957 2 Sheets-Sheet 2

Inventor
Noel J. de Mille
By
Roy E. Petherbridge
Attorney

United States Patent Office 2,938,556
Patented May 31, 1960

2,938,556

FRUIT OR VEGETABLE PEELING OR CLEANING MACHINE

Noel J. de Mille, Hillington, Glasgow, Scotland, assignor to The Prestige Group Limited, London, England, a British company Filed Sept. 9, 1957, Ser. No. 682,960

Claims priority, application Great Britain Sept. 11, 1956

1 Claim. (Cl. 146—50)

This invention has reference to fruit or vegetable peeling or cleaning machines and, while it is particularly applicable for cleaning potatoes, it may be used for peeling or cleaning fruit or other vegetables.

The object of the invention is to provide a machine which can be operated without connection to a water supply, which need not be operated in proximity to a drain for receiving the dirty water and peelings, and by which, nevertheless, the fruit or vegetables while being cleaned will be continuously washed.

According to the present invention a machine for peeling or cleaning fruit or vegetables comprises a receptacle with hinged or removable cover, a horizontally disposed disc rotatably supported within the receptacle so as to form a fruit or vegetable holding chamber above the disc and a water receiving chamber below the disc, the upper face of the disc and the wall of the holding chamber being provided with an abrasive lining, at least one scoop carried by the disc and arranged to extend into the water receiving chamber and means to rotate the disc. The arrangement is such that by filling the chamber below the disc with water, introducing the fruit or vegetables into the chamber above the disc, closing the receptacle by the cover and rotating the disc the fruit or vegetables are agitated and brought into contact with the abrasive linings which peel or clean the fruit or vegetables while the scoop gathers the water and projects it into the upper chamber to wash away the peelings which would otherwise accumulate in the upper chamber.

The invention further consists in a machine as set forth in the preceding paragraph wherein each scoop is so located that some of the water gathered thereby moves over the disc under centrifugal action to clean the abrasive face thereof.

The invention further consists in a machine as set forth in either of the preceding paragraphs wherein a housing is provided within the water receiving chamber of the receptacle in which is housed a gear frame carrying driving and driven spindles and intermeshing bevel gearing, and the disc is detachably connected to the driven spindle.

In order that the invention may be more clearly understood and readily carried into effect reference may now be had to the accompanying drawings illustrating one constructional form thereof and in which.

Figure 1:
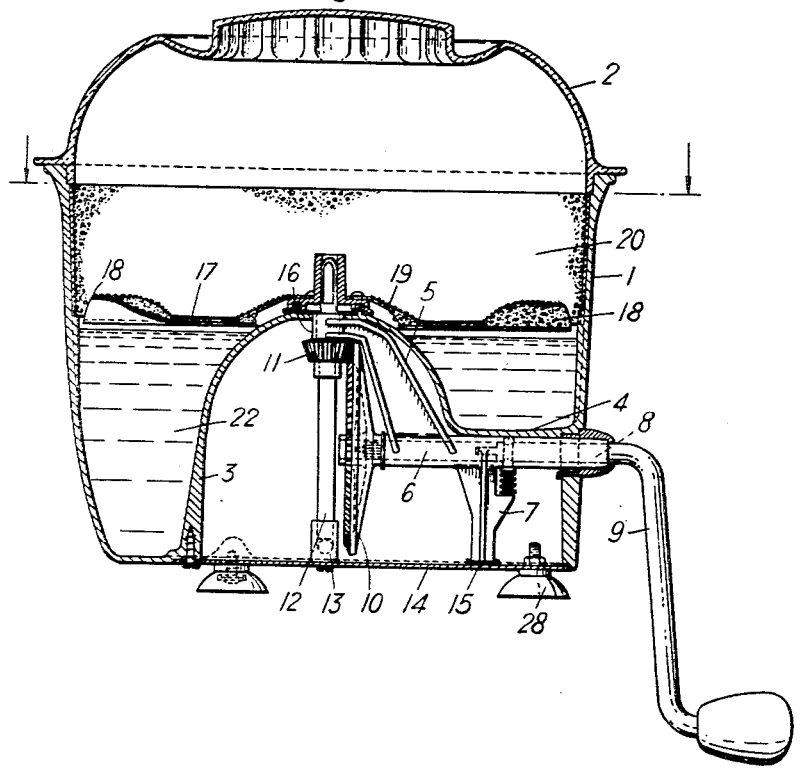
Fig. 1 is an axial cross-sectional view of a machine according to the invention, the gearing and operating handle being shown in elevation.
Figure 2:
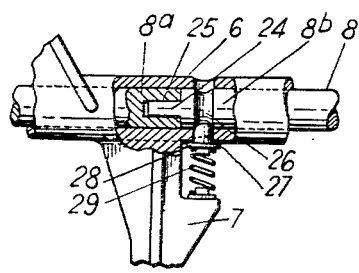
Fig. 2 is an enlarged detail view, partly in section, of the connection between the driving and driven spindles.

As shown in the drawings the improved machine comprises a substantially cylindrical or barrel like receptacle 1 which at its top is provided with a hinged or removable cover 2, preferably of transparent material. The bottom of said receptacle has cast or moulded integral therewith a housing 3. This housing is of dome-like formation with lateral extension 4 extending to the wall of the receptacle. Fitted within this housing is a gear frame 5 which fits snugly against the housing and is provided with a sleeve 6 which is accommodated within the extension 4 and with a downwardly extending limb 7. Through the sleeve 6 extends a driving spindle 8 provided with a crank handle 9. On the inner end of the spindle 8 is fast a driving bevel wheel 10 which meshes with a driven bevel wheel 11 fast on a vertical driven spindle 12. The lower end of the vertical spindle 12 is accommodated in a bearing 13 carried by a separate base member 14 secured to the bottom of the housing. A resilient pad 15 is secured by a suitable adhesive or cement to the free end of the limb 7 and is compressed against the base member 14 thus holding the gear frame 5 snugly against the housing 3. Towards its upper end the spindle 12 is journalled in a bearing 16 carried by the gear frame 3.

On the upper end of the driven spindle 12, which extends above the housing, is secured detachably a disc 17 which is provided with an abrasive upper surface. This disc is slightly less in diameter than that of the interior of the receptacle 1. Towards its periphery it is provided with two diametrically opposite raised undulations or protuberances 18 which merge into the first portion of the disc and at its centre it is of conical formation as shown at 19. This conical formation enables the outer part of the disc to be slightly below the top of the housing thereby enabling the height of the receptacle to be reduced without reducing the capacity of the potato receiving chamber 20.

The disc 17 is provided with two diametrically opposite scoops 21 positioned in flat parts of the disc and in proximity to the conical cylindrical portion 19. These scoops 21 extend downwardly from the plane of the disc 17 into a chamber 22 to be hereinafter described beneath the disc and are positioned adjacent apertures 23 in the disc 17.

That part of the receptacle 1 above the disc 17 constitutes the chamber 20 for the reception of the potatoes or other vegetables to be cleaned and the wall thereof is provided with an abrasive liner and that part of the receptacle 1 below the disc 17 constitutes a chamber 22 for water.

When in use water is introduced into the lower chamber 22 and the fruit or vegetables to be peeled or cleaned are then introduced to the upper chamber 20. The receptacle 1 is then closed by its cover 2. When the disc 17 is rotated, which can be done by the manually operated crank handle 9 on the driving spindle 8, the fruit or vegetables are subjected to a certain amount of agitation due in part to the form of the upper surface of the disc, including that of the protuberances 18 and the central conical formation 19 and are peeled or cleaned by the abrasive action of the wall of the upper chamber 20 and upper face of the disc 17.

Further, as the disc 17 is rotated, the scoops 21 gather and project upwardly through the apertures 23 sprays of water, which water effectively washes the fruit or vegetables whilst being cleaned. The water falls back into the lower chamber 22 to be re-cycled by the action of the scoops 21.

Further, part of the water raised by the scoops 21, under the action of centrifugal force, passes over and cleans the abrasive face of the disc 17.

Figure 3:
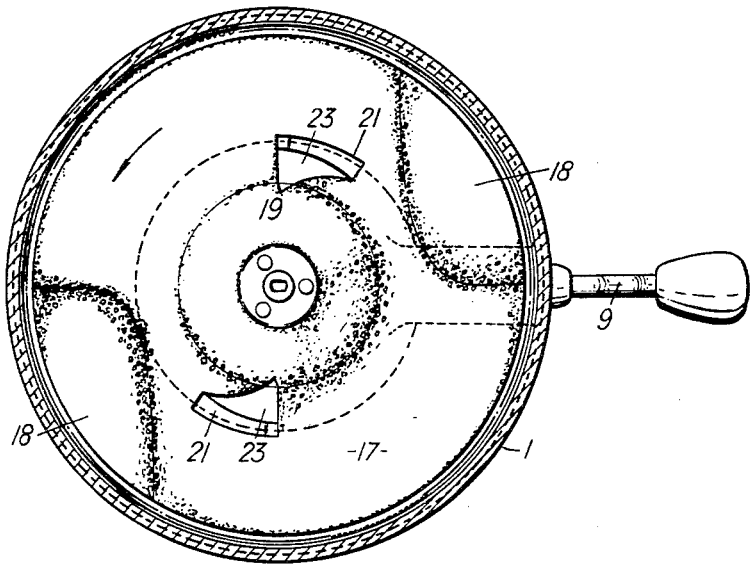
Fig. 3 is a cross-sectional view on the line 3—3 of Fig. 1.
Figure 4:
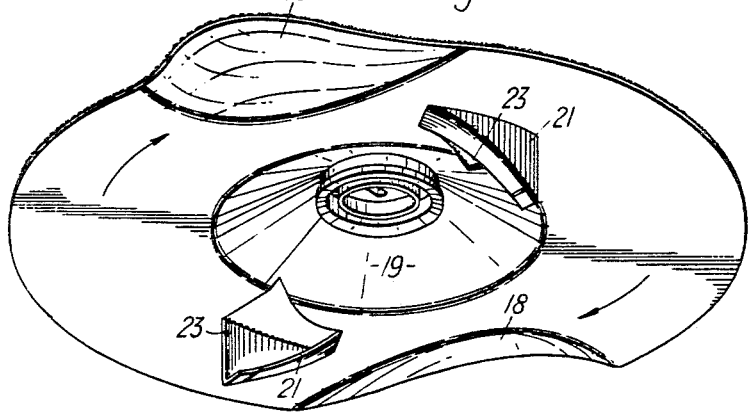
Fig. 4 is an underneath perspective view of the disc.

As shown in Fig. 3 the driving spindle 8 may be made in two parts 8a, 8b which are held together when the machine is being operated but which can be separated at other times to permit removal of the crank handle 9. For this purpose the part 8b is provided with a flattened portion 24 which is adapted to fit into a recess 25 in the end of the part 8a as shown. The part 8b is also provided with an annular groove 26 with which a plunger 27 cooperates. The plunger 27 is provided with a flange 28 and a helical spring 29 is arranged between the flange 28 and a step 30 formed on the limb 7.

From the foregoing description it will be understood that the machine is a self-contained unit in the sense that it is not necessary to connect it to a water supply and it is not necessary that the peeling or cleaning operation should be carried out in proximity to a water drain. The operation can therefore be effected at any point found convenient. The water, in addition to washing the fruit or vegetables, also maintains clean the abrasive surface of the disc.

It will be understood that in lieu of the disc being manually driven it may be driven by an electric motor which may be incorporated in the foot of the receptacle or elsewhere.

What is claimed is:

A machine for peeling vegetables and fruits comprising a receptacle having an annular side wall, an opening in said side wall, means cooperating with said side wall to define a water retaining chamber within the area surrounded by said side wall including a bottom wall having a central upwardly domed portion defining a hollow housing and a bridge portion joining said housing and said side wall at opposite sides of and above said opening in the side wall to define a radial passageway connecting said opening in the side wall and the interior of said housing, a crank handle having a spindle extending inwardly through said opening in the side wall, an opening in the upper end of said housing, a second spindle extending through said opening for rotation about an upright axis, a disc fixed to the upper end of said spindle, means for driving said second spindle in response to rotation of the spindle on said crank handle including a third spindle coaxial with and joined to said first spindle and intermeshing gears operatively connected to said second and third spindles within said housing, an abrasive lining on the upper surface of the disc and the surface of the side wall rising upwardly from said disc, and a scoop carried by said disc extending into a body of water in said receptacle below said disc through which said water is projected upwardly of said disc during rotation of said disc.

References Cited in the file of this patent
UNITED STATES PATENTS

| 1,686,456 | Kohler | Oct. 2, 1928 |
| 1,966,501 | Hoe | July 17, 1934 |
| 2,514,493 | Hetherington | July 11, 1950 |

FOREIGN PATENTS

| 666,271 | Great Britain | Feb. 6, 1952 |